March 29, 1932.  E. F. SCHERMERHORN  1,851,409
RAIL JOINT SHIM DEVICE
Filed Nov. 17, 1931
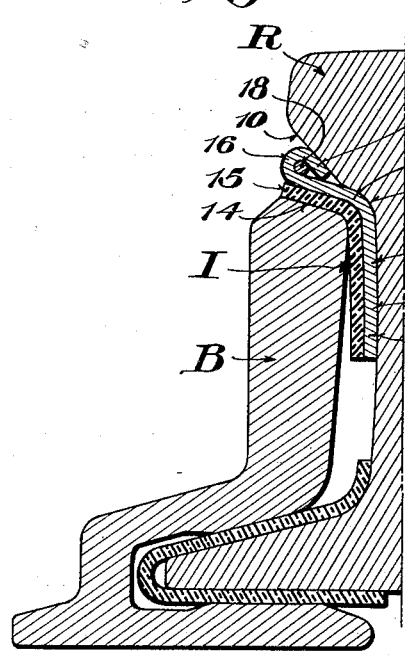
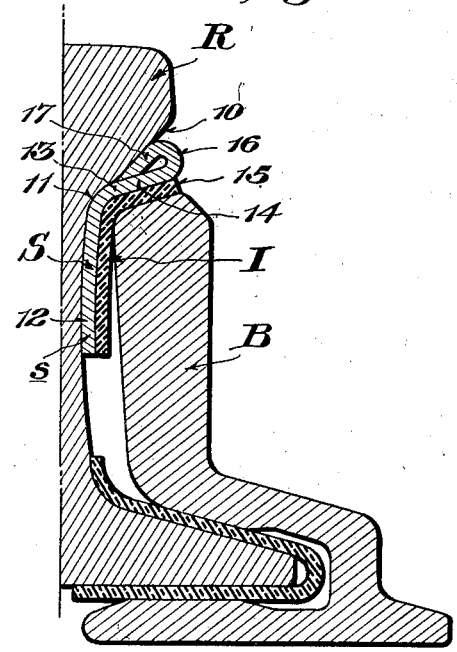
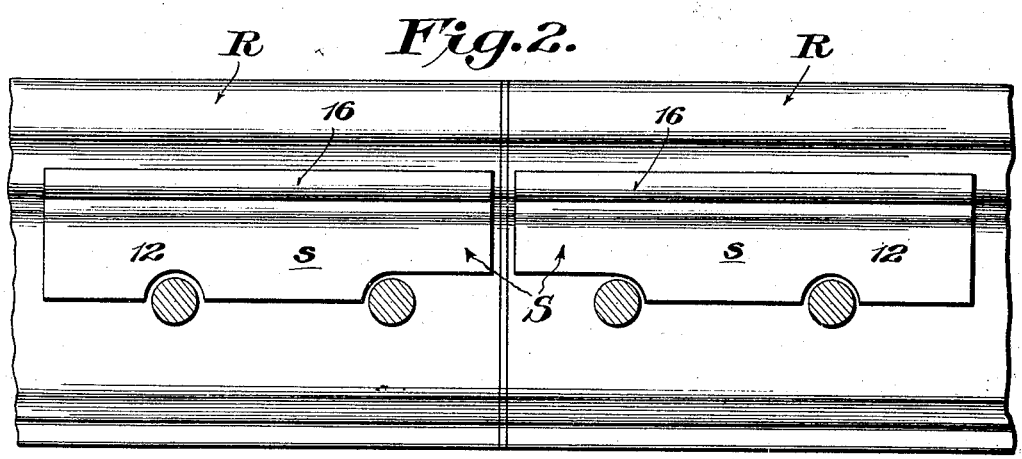
Inventor
E. F. Schermerhorn
By D. P. Wolhaupter
Attorney Patented Mar. 29, 1932

1,851,409

UNITED STATES PATENT OFFICE

EDWARDS F. SCHERMERHORN, OF BROOKLYN, NEW YORK, ASSIGNOR TO THE RAIL JOINT COMPANY, OF NEW YORK, N. Y., A CORPORATION OF NEW YORK

RAIL JOINT SHIM DEVICE

Application filed November 17, 1931. Serial No. 575,610.

This invention relates to a novel shim device for use in producing insulated joints for so-called headfree rails.

As is well known, a so-called headfree rail derives its name on the one hand from the fact that its head is of inverted truncated pyramidical shape in cross section and, on the other hand, from the fact that when two such rails are joined together the splice bars take loading engagement at their inner upper corners with the head fillets of the rails and have clearance outwardly of said fillets from the under sides of the rail heads. While rails and joints of this character are extremely desirable and advantageous from many different viewpoints, it has been found that when insulating material is interposed the upper inner corners of the splice bars and the head fillets of the rails the insulation tends quickly to crush and disintegrate due to concentration of the load on a relatively small area of the insulation. Therefore, in producing insulated rail joints for headfree rails it is desirable to provide means whereby the load sustaining portion of the insulating material shall have relatively extensive bearing areas. Accordingly, the general object of the present invention is to provide a shim device for use with headfree rails to, in effect, convert the heads of such rails to the standard or head fishing contact type, thus to provide for the use of splice bars and insulating joints of the head fishing contact type in the splicing of headfree rails to obtain the advantages of the relatively extensive bearing areas for the insulating material afforded by joints of this type.

Another object of the invention is to provide a shim device for the purpose mentioned which may be economically produced from sheet metal and which embodies a novel construction for cooperation with rails of the headfree type in a manner to effectively sustain loads imposed on the rails and transmitted through the shim device to the insulating material and the splice bar.

With the foregoing and other objects in view, which will become more fully apparent as the nature of the invention is better understood, the same consists in the novel construction and in the novel combination and arrangement of features as will be hereinafter more fully described, illustrated in the accompanying drawings and defined in the appended claims.

In the drawings:—

Figure 1 is a transverse section through an insulated joint for headfree rails illustrating the use of the present shim device according to one practical embodiment of the same.

Figure 2 is a side elevation of the joint illustrated in Fig. 1 with the splice bar removed; and Figure 3 is a view similar to Fig. 1 illustrating a shim device of slightly alternative form.

Referring to the drawings in detail, it will be observed that while the rails, designated as R, R, are of the headfree type, the insulated joint is of the head fishing contact type affording relatively extensive bearing areas for the insulating material whereby longevity of the joint is assured.

The headfree rail illustrated are of the well-known type having the sides of their heads, beginning at points spaced downwardly from their top surfaces, inclined inwardly as at 10 and merging into the usual rail head fillets 11. Ordinarily a joint between two rails of this type is effected by means of a splice bar which, at its head, takes loading engagement solely at its inner upper corner with the head fillets of the rails. When, however, an insulated joint is to be provided between two such rails it is not satisfactory merely to interpose a layer of insulation between the head fillets of the rails and the upper inner corner of the splice bar because the concentration of the load on the relatively small area of the insulation within the limits of the head fillets of the rails soon results in crushing and disintegration of the insulation. Therefore, according to the present invention, a shim device S, formed preferably in two separate sections s, s, one for cooperation with each rail, is provided to seat against the rails to, in effect, convert the rails to the head fishing contact type. Thus, provision is made for the use of a splice bar B of the head fishing contact type and the production of an insulated joint of the head fishing contact type in which the insulation I has relatively extensive bearing areas cooperating with the shim device and the splice bar, respectively, so that the load is distributed over a substantial area of the insulation with consequent prolongation of the life of the insulation.

Referring particularly to Figs. 1 and 2 of the drawings, it will be observed that the respective sections s, s, of the shim device are, except for their right and left hand form, duplicates of each other and that each section is formed from suitable sheet metal to provide a vertical body portion 12 to lie against the rail web, a curved portion 13 to fit the head fillet of the rail, and a flange portion 14 extending outward from the curved portion 13 to underlie the rail head and to afford at its under side a relatively extensive flat bearing area similar to the fishing surface at the under side of a rail of the well known standard type.

The splice bar B used with the present shim device is, as aforesaid, and as illustrated in the drawings, of the head fishing contact type having a flat top surface for cooperation with the flange portions 14 of the shim sections, and the insulation I is inclusive of a flange portion 15 interposed between and having surface contact with the flange portions 14 of the shim sections and the top of the splice bar, respectively.

In order to adapt the flange portions 14 of the shim sections to sustain loads imposed thereon, i. e., in order to support said flange portions against upward movement into the voids or vacant spaces existing at the under sides of the rail heads under the influence of loads imposed on the joint, the said flange portion of each shim section is rolled or turned upwardly and inwardly upon itself, as indicated at 16, and then extended downwardly and inwardly, as indicated at 17, preferably into contact at its free edge with the upper face of the flange portion, the arrangement in this respect being such that the top of the reinforcing rib formed by turning the marginal part of the flange portion upon itself contacts with the inclined side surface 10 of the rail head and thus supports the flange portion 14 against upward movement and holds the same in correct relation to the top of the splice bar and the interposed insulation.

While the main consideration in the rolling or turning of the marginal part of the flange portion 14 of each shim section upon itself is to provide for contact of the resulting reinforcing rib formation with the inclined face 10 of the rail when the flange portion 14 is disposed at the proper angle relative to the rail for correct cooperation with the top of the splice bar and the interposed insulation, a preferred construction in this respect is to extend the portion 17 downwardly and inwardly at such an angle relative to the flange portion 14 that when the latter portion is disposed at the proper angle relative to the rail the upper face of the portion 17 bears flat against the inclined rail head surface 10 thus to afford a relatively extensive contact area between the shim section and said rail surface.

In some instances it may be desirable to stiffen the marginal reinforcing and load sustaining rib of the flange portion 14 by rolling or turning the metal of the flange portion about a core forming rod 18 as illustrated in Fig. 1 of the drawings, particularly in instances where the metal of the shim sections is comparatively thin. On the other hand, this core is not essential and may readily be dispensed with, as illustrated in Fig. 3 of the drawings, particularly in instances where the shim sections are formed of relatively thick or heavy sheet metal. Moreover, as aforesaid, the free edge of the portion 17 may in any instance contact with or be spaced from the top of the flange portion 14 and in either event no special forming of said free edge is required, as is apparent from the illustration in Fig. 1 of the drawings. On the other hand, the free edge of the portion 17 may be chamfered as illustrated in Fig. 3 for surface contact with the upper face of the flange portion.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A shim device for use in producing insulated joints for headfree rails the heads of which rails are of inverted truncated pyramidical shape in cross section, comprising a sheet metal member inclusive of a body portion to lie against the web of the rail, a fillet portion to engage the head fillet of the rail, and a flange portion extending outward from said fillet portion to underlie the rail head and to afford a relatively extensive bearing area for the insulating material to be interposed between said shim and the splice bar, said flange portion being bent upwardly and inwardly upon itself to provide a marginal reinforcing rib for engagement with the inwardly inclined side face of the rail to adapt the flange portion to sustain loads imposed thereon.

2. A shim device for use in producing insulated joints for headfree rails the heads of which rails are of inverted truncated pyramidical shape in cross section, comprising a sheet metal member inclusive of a body portion to lie against the web of the rail, a curved portion to fit the head fillet of the rail, and a flange portion extending outward from said curved portion to underlie the rail head and to afford a relatively extensive bearing area for the insulating material to be interposed between said shim and the splice bar, the marginal part of said flange portion being bent upwardly and inwardly and then downwardly and inwardly for flat surface engagement with the inwardly inclined side face of the rail head to support the flange portion in proper relation to the slice bar and the interposed insulation.

3. A shim device as set forth in claim 1 in which a metal core is provided within the rib formed by bending the metal of the flange upon itself in the manner stated.

4. A shim device as set forth in claim 2 in which a metal core is provided within the rib formed by bending the metal of the flange upon itself in the manner stated.

5. A shim device as set forth in claim 2 in which the free edge of the downwardly and inwardly bent portion of the shim has flat surface contact with the upper face of the flange portion.

6. A shim device as set forth in claim 2 in which the free edge of the downwardly and inwardly bent portion of the shim is chamfered and has flat surface contact with the upper face of the flange portion.

In testimony whereof I hereunto affix my signature.

EDWARDS F. SCHERMERHORN.